(12) United States Patent
Sato et al.

(10) Patent No.: US 11,611,534 B2
(45) Date of Patent: Mar. 21, 2023

(54) DATA PROCESSING SYSTEM, DATA PROCESSING METHOD, AND PROGRAM

(71) Applicant: Mitsubishi Power, Ltd., Yokohama (JP)

(72) Inventors: Koji Sato, Yokohama (JP); Akihisa Endo, Yokohama (JP); Hiroyasu Ishigaki, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/057,276

(22) PCT Filed: May 24, 2019

(86) PCT No.: PCT/JP2019/020761
§ 371 (c)(1),
(2) Date: Nov. 20, 2020

(87) PCT Pub. No.: WO2019/225756
PCT Pub. Date: Nov. 28, 2019

(65) Prior Publication Data
US 2021/0218707 A1    Jul. 15, 2021

(30) Foreign Application Priority Data
May 25, 2018    (JP) .............................. JP2018-101061

(51) Int. Cl.
*G06F 15/16*    (2006.01)
*H04L 9/40*    (2022.01)
(Continued)

(52) U.S. Cl.
CPC ...... *H04L 63/0245* (2013.01); *H04L 63/0218* (2013.01); *H04L 67/12* (2013.01); *H04L 67/562* (2022.05)

(58) Field of Classification Search
None
See application file for complete search history.

(56) References Cited

U.S. PATENT DOCUMENTS 9,047,648 B1 *  6/2015  Lekutai .................. G16H 40/40
10,033,766 B2 *  7/2018  Gupta ..................... H04L 43/04
(Continued)

FOREIGN PATENT DOCUMENTS

JP    10-164063    6/1998
JP    3658587    6/2005
(Continued)

OTHER PUBLICATIONS

International Search Report dated Aug. 13, 2019 in corresponding International (PCT) Application No. PCT/JP2019/020761, with English Translation.
(Continued)

*Primary Examiner* — Phuoc H Nguyen
(74) *Attorney, Agent, or Firm* — Wenderoth, Lind & Ponack, L.L.P.

(57) ABSTRACT

An agent device transmits certain data, which is used for generating display data, of data relating to a plurality of pieces of operation data collected from an instrument to a computation server device. A service broker device relays certain data transmitted from the agent device to the server device. The server device generates display data on the basis of certain data relayed by the service broker device.

10 Claims, 7 Drawing Sheets

(51) Int. Cl.
*H04L 67/12* (2022.01)
*H04L 67/562* (2022.01)

(56) References Cited

U.S. PATENT DOCUMENTS

| | | |
|---|---|---|
| 2004/0156311 A1 | 8/2004 | Hirano et al. |
| 2004/0199409 A1* | 10/2004 | Brown .................. G16H 40/67 600/316 |
| 2008/0040151 A1* | 2/2008 | Moore .................. G16H 40/67 705/2 |
| 2014/0126463 A1 | 5/2014 | Ishiyama |
| 2014/0254359 A1* | 9/2014 | Alisawi ............. H04W 28/0231 370/230 |
| 2016/0004820 A1* | 1/2016 | Moore .................. H04W 4/21 705/3 |
| 2016/0359704 A1* | 12/2016 | Gandham ............ G06F 16/9535 |
| 2018/0284735 A1* | 10/2018 | Cella ...................... G06N 3/084 |

FOREIGN PATENT DOCUMENTS

| | | |
|---|---|---|
| JP | 2006-101493 | 4/2006 |
| JP | 2010-019543 | 1/2010 |
| JP | 2014-096685 | 5/2014 |
| WO | 02/067069 | 8/2002 |

OTHER PUBLICATIONS

Written Opinion dated Aug. 13, 2019 in corresponding International (PCT) Application No. PCT/JP2019/020761, with English Translation.

* cited by examiner

DATA PROCESSING SYSTEM, DATA PROCESSING METHOD, AND PROGRAM

TECHNICAL FIELD

The present invention relates to a data processing system, a data processing method, and a program.

Priority is claimed on Japanese Patent Application No. 2018-101061, filed May 25, 2018, the content of which is incorporated herein by reference.

BACKGROUND ART

In Patent Literature 1, a technology for transmitting data collected at a site of a plant to a data center through a communication network and providing an analysis result from the data center has been disclosed.

CITATION LIST

Patent Literature

[Patent Literature 1]
Japanese Patent No. 3658587

SUMMARY OF INVENTION

Technical Problem

An instrument manufacturer has knowhow for calculating an instrument state and the like from operation data and, by providing a calculation result for an owner of the instrument, the owner can acquire data that is beneficial to the operation of the instrument. Calculation based on operation data may be confidential information of an instrument manufacturer in many cases. For this reason, an instrument manufacturer performs calculation under management of the instrument manufacturer by installing the computational logic in a server device disposed in an environment separated from an instrument through a network such that such the computational logic does not leak out.

Operation data of an instrument is considered to be confidential information of an owner of the instrument. For this reason, an owner may have resistance against operation data of an instrument being caused to be in an obtainable state through a network. In addition, depending on an owner, there may be a situation in which the owner does not desire to disclose operation data even to a manufacturer of an instrument. Furthermore, there are also cases in which there is a situation in which operation data cannot be disclosed to a manufacturer due to legal regulations and the like.

An object of the present invention is to provide a data processing system, a data processing method, and a program enabling acquisition of operation data of an instrument device to be restricted while protecting know-how based on the operation data.

Solution to Problem

According to a first aspect of the present invention, a data processing system includes: an agent device configured to transmit data relating to operation data of an instrument that is collected from the instrument; a service broker device configured to relay data; and a computation server device configured to generate display data on the basis of the data relating to the operation data, the agent device includes an operation data transmitting unit that transmits certain data, which is used for generating the display data, of data relating to a plurality of pieces of operation data collected from the instrument to the computation server device, the service broker device includes an operation data relaying unit that relays the certain data transmitted from the agent device to the computation server device, and the computation server device includes a display data generating unit that generates the display data on the basis of the certain data relayed by the service broker device.

According to a second aspect of the present invention, in the data processing system according to the first aspect, the agent device and the instrument are connected using a first network, the service broker device and the computation server device are connected using a second network other than the first network, and a transmission path for transmitting the certain data from the agent device to the service broker device may be disposed outside the first network.

According to a third aspect of the present invention, in the data processing system according to the second aspect, the service broker device may include a display data transmitting unit that performs pull transmission of the display data generated by the computation server device to a client device on the basis of a data request from the client device disposed outside the second network.

According to a fourth aspect of the present invention, the data processing system according to the third aspect may further include: a first firewall device configured to be disposed between the agent device and the service broker device; and a second firewall device other than the first firewall device configured to be disposed between the service broker device and the client device.

According to a fifth aspect of the present invention, in the data processing system according to any one of the first to fourth aspects, the service broker device and the computation server device may be mounted in separate computers.

According to a sixth aspect of the present invention, in the data processing system according to any one of the first to fifth aspects, the operation data transmitting unit of the agent device may be configured to perform push transmission of the certain data and not to perform pull transmission of the certain data based on a data request in a case in which a predetermined condition is satisfied.

According to a seventh aspect of the present invention, in the data processing system according to any one of the first to sixth aspects, the agent device includes an operation data acquiring unit that acquires certain data that is structured on the basis of a predetermined protocol defined by a data collecting device from the data collecting device that structures the data relating to the plurality of pieces of operation data collected from the instrument, and the operation data transmitting unit may transmit the acquired certain data on the basis of a general encrypted communication protocol.

According to an eighth aspect of the present invention, a data processing system includes: a service broker device configured to relay data that is transmitted from an agent device transmitting data, which is used for generating display data, of data relating to operation data of an instrument collected from the instrument; and a computation server device configured to generate the display data on the basis of the data, the service broker device includes an operation data relaying unit that relays the data transmitted from the agent device to the computation server device and a display data transmitting unit that performs pull transmission of the display data generated by the computation server device to a client device, and the computation server device includes a display data generating unit that generates the display data on the basis of the data relayed by the service broker device.

According to a ninth aspect of the present invention, a data processing method includes: a step of transmitting certain data, which is used for generating display data, of data relating to a plurality of pieces of operation data collected from an instrument; a step of relaying the transmitted certain data; and a step of generating the display data on the basis of the relayed certain data.

According to a tenth aspect of the present invention, a program causes a computer to execute: a step of receiving certain data transmitted from an agent device transmitting only the certain data, which is used for generating display data, of data relating to operation data of an instrument collected from the instrument; and a step of generating the display data on the basis of the certain data.

Advantageous Effects of Invention

According to at least one of the aspects described above, a data processing system can limit acquisition of operation data of an instrument while protecting know-how based on the operation data.

DESCRIPTION OF EMBODIMENTS

First Embodiment

Hereinafter, an embodiment will be described in detail with reference to the drawings.

Figure 1:
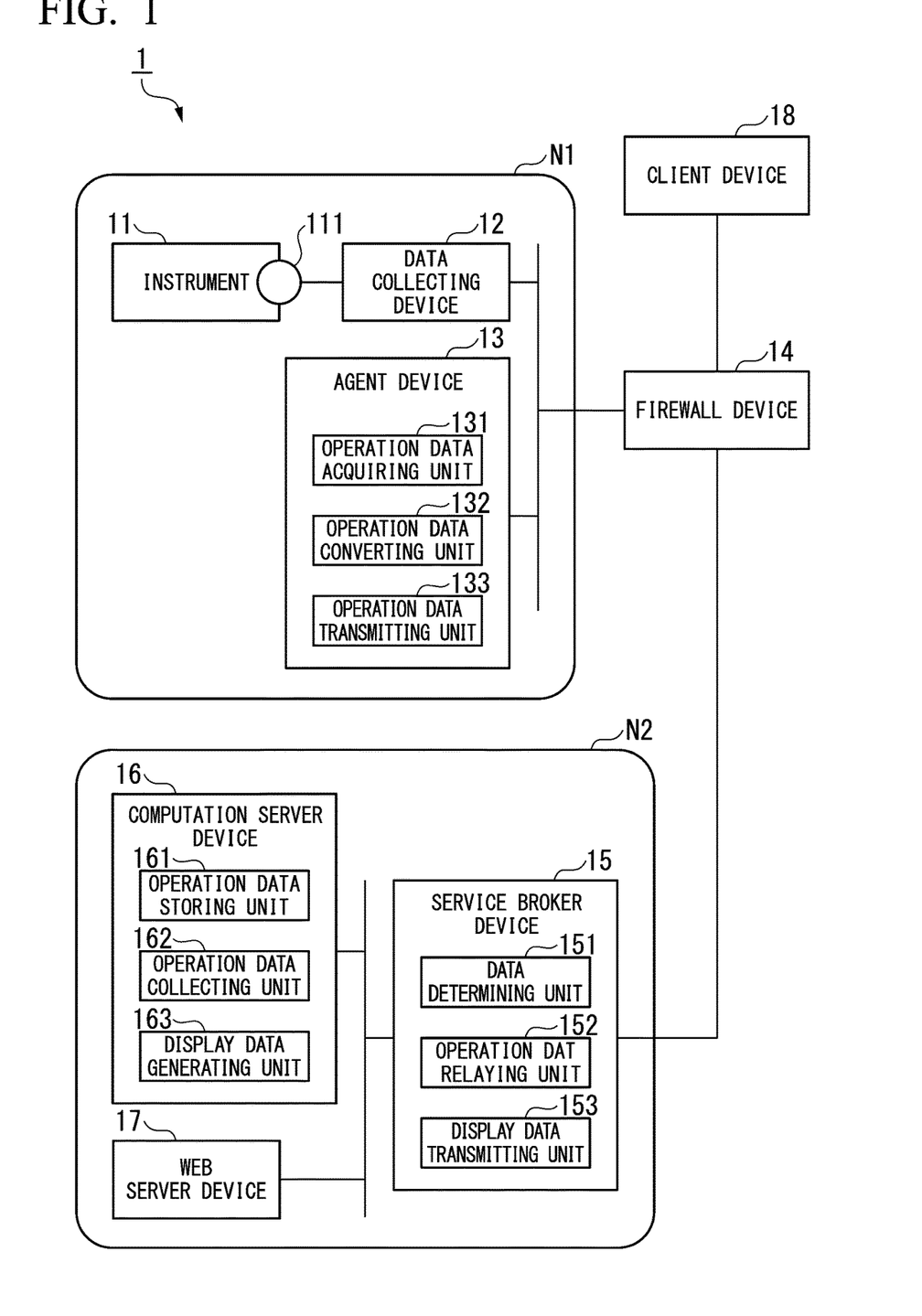
FIG. 1 is a schematic view illustrating the configuration of a data processing system according to an embodiment.

FIG. 1 is a schematic view illustrating the configuration of a data processing system according to an embodiment.

The data processing system 1 according to a first embodiment provides display data calculated on the basis of operation data of an instrument 11 that is disposed in a power plant.

<Entire Configuration>

The data processing system 1 includes an instrument 11, a data collecting device 12, an agent device 13, a firewall device 14, a service broker device 15, a computation server device 16, a web server device 17, and a client device 18. In the first embodiment, the instrument 11, the data collecting device 12, and the agent device 13 are disposed on a central network N1 of the power plant. At this time, the agent device 13 may be connected to the instrument 11 through the data collecting device 12. The data collecting device 12 and the agent device 13 according to the first embodiment are mounted in separate computers.

In the first embodiment, the service broker device 15, the computation server device 16, and the web server device 17 are disposed on a service network N2. In addition, the service broker device 15, the computation server device 16, and the web server device 17 according to the first embodiment are mounted in separate computers.

A plurality of sensors 111 that measure operation data are disposed in the instrument 11.

The data collecting device 12 regularly acquires measurement values from the plurality of sensors 111 and converts the measurement values into predetermined structures that are appropriate for the data collecting device. The data collecting device 12 transmits accumulated data using a protocol defined in the data collecting device 12.

The agent device 13 acquires data structured using the protocol defined in the data collecting device 12 from the data collecting device 12. The agent device 13 extracts necessary data from the acquired data and performs push transmission of the extracted data to the service broker device 15 through the firewall device 14. The push transmission is a transmission system for actively transmitting data to a transmission destination defined in advance without any data request. In addition, it is preferable that the agent device 13 should be realized by software not depending on an operating system.

The firewall device 14 blocks an unauthorized access from outside of the central network N1 to the inside of the central network N1. The firewall device 14 blocks an unauthorized access using packet filtering and the like. In addition, external devices such as the service broker device 15 and the client device 18 are blocked from transmission of data to the instrument 11, the data collecting device 12, and the agent device 13 by the firewall device 14.

It is preferable that communication performed through the firewall device 14 should be communication using a general encrypted communication protocol. An example of the general encrypted communication protocol includes a Hypertext Transfer Protocol Secure (HTTPS). In other words, the firewall device 14 may block communication using a protocol other than a general encrypted communication protocol. By using a general encrypted communication protocol, confidentiality of communication is objectively secured when compared to a case using the protocol defined in the data collecting device 12. The encrypted communication protocol is assumed to be a protocol of which use is permitted by an owner of the instrument 11 or an installation country of the instrument 11.

The service broker device 15 relays communication between the computation server device 16 and a device disposed outside the service network N2. In other words, the service broker device 15 accepts an access from the outside of the service network N2 and relays data to the computation server device 16 in a case in which a condition is satisfied. In addition, the service broker device 15 relays a result of computation acquired by the computation server device 16 to an instrument disposed outside the service network N2. In other words, the service broker device 15 is responsible for an interface of the service network N2.

The computation server device 16 collects operation data of the instrument 11 and generates display data provided for an owner or the like of the instrument 11 on the basis of the collected operation data.

The web server device 17 provides a web service for presenting display data generated by the computation server device 16. The web service is provided in accordance with pull transmission based on a data request of the client device 18 or the like. The pull transmission is a transmission system for transmitting data to a transmission source of a data request on the basis of reception of the data request.

The client device 18 is a computer that is connected to a network. An application such as a web browser or the like is mounted in the client device 18, and a data request of a web service is transmitted to the service broker device 15 using the application. The client device 18 displays provided display data as a web service. Although the client device 18 illustrated in FIG. 1 is connected to the central network N1, the client device 18 may be disposed at any place from which the service broker device 15 can be accessed through a network.

The agent device 13, the firewall device 14, and the service broker device 15 may store a configuration file that defines permitted communications in advance and perform communication on the basis of this configuration file.

<Configuration of Agent Device>

The agent device 13 includes an operation data acquiring unit 131, an operation data converting unit 132, and an operation data transmitting unit 133.

The operation data acquiring unit 131 acquires part of structured operation data from the data collecting device 12 by using a predetermined protocol defined by the data collecting device 12. In other words, the operation data acquiring unit 131 extracts operation data of a specific type, which is used for generating display data using the computation server device 16, from the data collecting device 12. In addition, a type of operation data to be acquired by the operation data acquiring unit 131 is defined on the basis of a computational logic in advance by a manager or the like of the computation server device 16.

The operation data converting unit 132 converts the structured operation data acquired by the operation data acquiring unit 131 into a data format used for processes of the service broker device 15 and the computation server device 16. The operation data structured by the data collecting device 12 may be different for each type of the data collecting device 12 as a format that is appropriate for collection of data. The operation data converting unit 132 converts operation data of various data formats into a predetermined data format that is used for the processes of the service broker device 15 and the computation server device 16. In accordance with this, the service broker device 15 and the computation server device 16 do not need to process a different data format for each type of the data collecting device 12.

The operation data transmitting unit 133 performs push transmission of part of the operation data converted by the operation data converting unit 132 to the service broker device 15. In addition, the operation data transmitting unit 133 does not accept a data request for requesting pull transmission of the operation data. In this way, the agent device 13 prohibits referring to data other than minimum required operation data from outside of the central network N1 and thus can prevent an unnecessary outflow of data outside of the central network N1.

<Operation of Agent Device>

Figure 2:
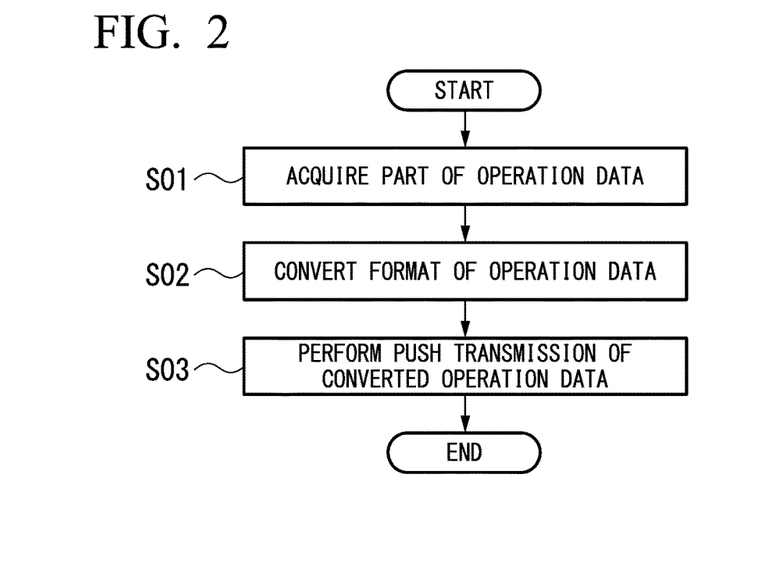
FIG. 2 is a flowchart illustrating an operation of an agent device according to an embodiment.

FIG. 2 is a flowchart illustrating an operation of the agent device according to an embodiment.

First, the operation data acquiring unit 131 acquires some of a plurality of pieces of structured operation data from the data collecting device 12 using a predetermined protocol defined by the data collecting device 12 on the basis of a timing and a condition defined in advance (Step S1). Next, the operation data converting unit 132 converts acquired structured operation data into a data format that is used in the processes of the service broker device 15 and the computation server device 16 (Step S2). Next, the operation data transmitting unit 133 performs push transmission of the converted operation data to the service broker device 15 using a general encrypted communication protocol (Step S3).

<Configuration of Service Broker Device>

The service broker device 15 includes a data determining unit 151, an operation data relaying unit 152, and a display data transmitting unit 153.

The data determining unit 151 determines whether or not communication from the outside is communication defined in advance as a processing target. The communication defined in advance as a processing target in the first embodiment is at least one of push transmission of operation data, communication transmitted from the agent device 13 defined in advance, and a data request for display data.

The operation data relaying unit 152 accepts push transmission of operation data from the agent device 13 defined in advance and relays the operation data to the computation server device 16. The operation data relaying unit 152 does not relay operation data transmitted from devices other than the agent device 13 defined in advance.

The display data transmitting unit 153 accepts a data request for requesting transmission of a computation result acquired by the computation server device 16 from an external device including the client device 18. The display data transmitting unit 153 causes the web server device 17 to start a web service for presenting the display data on the basis of an accepted data request. The display data transmitting unit 153 relays a data request to the web server device 17 and transmits display data output from the web server device 17 on the basis of the data request to the client device 18.

<Operation of Service Broker Device>

Figure 3:
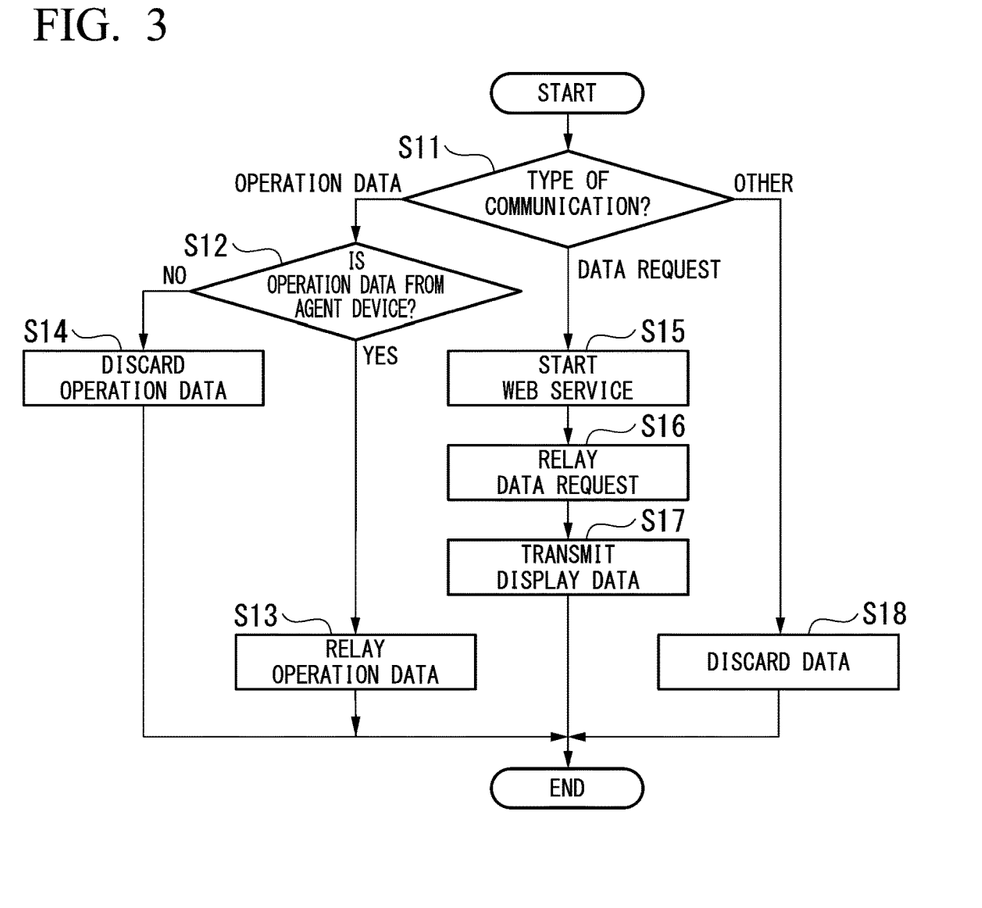
FIG. 3 is a flowchart illustrating an operation of a service broker device according to an embodiment.

FIG. 3 is a flowchart illustrating an operation of the service broker device according to an embodiment.

When the service broker device 15 receives communication from an external device, the data determining unit 151 determines whether or not the communication is push transmission of operation data, a data request for display data, or other communication (Step S11). When it is determined that push transmission of operation data has been received (Step S11: operation data), the data determining unit 151 determines whether or not the operation data has been transmitted from the agent device 13 defined in advance (Step S12). In a case in which the operation data has been transmitted from the agent device 13 defined in advance (Step S12: Yes), the operation data relaying unit 152 relays the received operation data to the computation server device 16 (Step S13). However, in a case in which the operation data has not been transmitted from the agent device 13 defined in advance (Step S12: No), the data determining unit 151 discards the operation data (Step S14).

In a case in which the data determining unit 151 determines that a data request for display data has been received (Step S11: data request), the display data transmitting unit 153 causes the web server device 17 to start a web service for presenting display data on the basis of the accepted data request (Step S15). The display data transmitting unit 153 relays the data request to the web server device 17 (Step S16). The display data transmitting unit 153 acquires display data from the web server device 17 and transmits the acquired display data to the client device 18 (Step S17).

In a case in which it is determined that received communication is neither a push transmission of operation data nor a data request for display data (Step S11: other), the data determining unit 151 discards the data (Step S18).

In other words, the service broker device 15 relays only communication (push transmissions of operation data from the agent device 13 and a data request for display data from an arbitrary device) defined in advance to a device within the service network N2. In this way, the service broker device 15 can block transmission of operation data for the purpose of reverse engineering of the computational logic of the computation server device 16 and a data request for reading operation data stored by the computation server device 16.

<Configuration of Computation Server Device>

The computation server device 16 includes an operation data collecting unit 162, an operation data storing unit 161, and a display data generating unit 163.

The operation data collecting unit 162 acquires operation data that has been push-transmitted by the agent device 13 defined in advance from the service broker device 15. The operation data collecting unit 162 records the operation data in the operation data storing unit 161 in association with a time at which the operation data has been collected by the data collecting device 12.

The display data generating unit 163 generates display data from the operation data stored in the operation data storing unit 161 using a predetermined computational logic.

<Operation of Computation Server Device>

Figure 4:
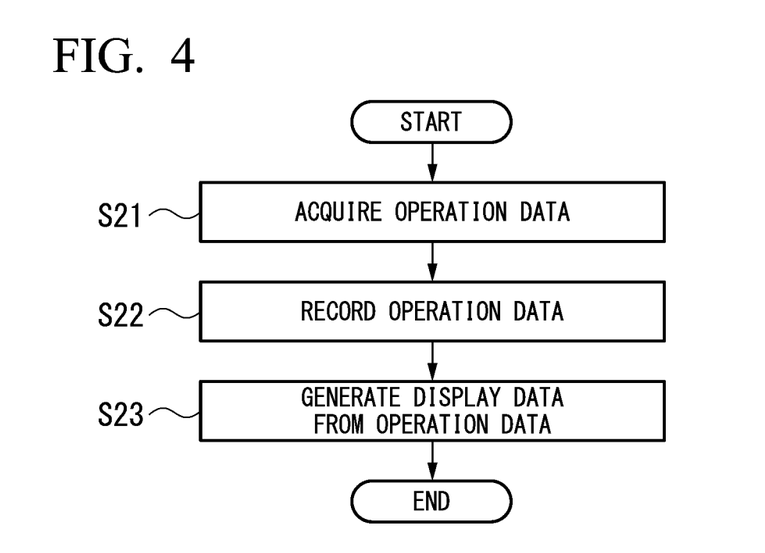
FIG. 4 is a flowchart illustrating an operation of a computation server device according to an embodiment.

FIG. 4 is a flowchart illustrating an operation of the computation server device according to an embodiment.

When the service broker device 15 relays operation data that has been push-transmitted by the agent device 13 defined in advance in Step S13 described above to the computation server device 16, the operation data collecting unit 162 acquires the operation data (Step S21). The operation data collecting unit 162 records the acquired operation data in the operation data storing unit 161 in association with a time at which the operation data has been collected by the data collecting device 12 (Step S22). Then, the display data generating unit 163 generates display data from operation data stored in the operation data storing unit 161 using a predetermined computation logic (Step S23). At this time, the display data generating unit 163 may generate display data using not only new operation data acquired in Step S21 but also past operation data stored in the operation data storing unit 161.

<Operation of Data Processing System>

Figure 5:
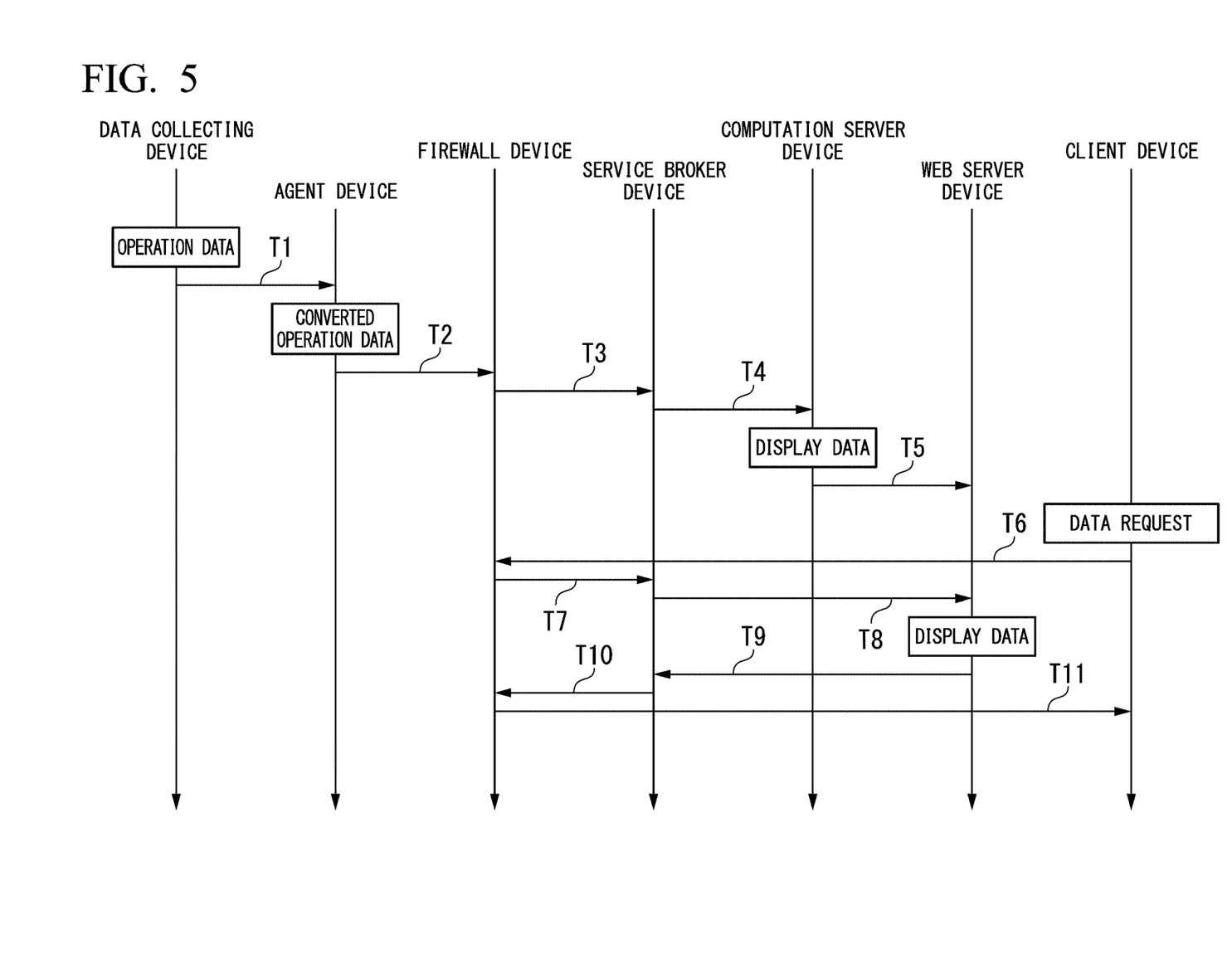
FIG. 5 is a sequence diagram illustrating an example of the process of displaying display data in a data processing system according to an embodiment.

FIG. 5 is a sequence diagram illustrating an example of the process of displaying display data in the data processing system according to an embodiment.

Operation data collected from the sensors 111 of the instrument 11 is accumulated in the data collecting device 12. Part of operation data used for generating display data among a plurality of pieces of operation data is transmitted from the data collecting device 12 to the agent device 13 using a protocol defined in the data collecting device 12 (T1). The agent device 13 converts the transmitted operation data into a data format used by the service broker device 15 and the computation server device 16 and performs push transmission of the converted data to the service broker device 15 using a general encrypted communication protocol. The extracted operation data is transmitted from the agent device 13 to the firewall device 14 (T2). A packet filtering process such as determination of whether or not the communication protocol is a general encrypted communication protocol, and whether the communication is registered or permitted on the firewall device 14 in advance is performed by the firewall device 14. Thereafter, the operation data is transmitted from the firewall device 14 to the service broker device 15 (T3).

It is determined whether or not communication of the operation data is defined communication by the service broker device 15. Thereafter, the operation data is transmitted from the service broker device 15 to the computation server device 16 (T4). The operation data is recorded in the computation server device 16, and the computation server device 16 generates display data on the basis of the accumulated operation data. The generated display data is transmitted from the computation server device 16 to the web server device 17 (T5).

The client device 18 transmits a data request for requesting transmission of display data to the service broker device 15 using a general encrypted communication protocol in accordance with a user's operation or the like. The data request is transmitted from the client device 18 to the firewall device 14 (T6). A packet filtering process such as determination of whether or not the communication protocol is a general encrypted communication protocol, whether or not the communication is communication registered or permitted on the firewall device 14, and the like is performed by the firewall device 14. Thereafter, the data request is transmitted from the firewall device 14 to the service broker device 15 (T7).

It is determined whether or not the data request is defined communication by the service broker device 15. Thereafter, the data request is transmitted from the service broker device 15 to the web server device 17 (T8). The web server device 17 transmits the display data transmitted in T5 to the client device 18 as a response to the data request. The display data is transmitted from the web server device 17 to the service broker device 15 (T9). Thereafter, the display data is transmitted from the service broker device 15 to the firewall device 14 (T10). Then, the display data is transmitted from the firewall device 14 to the client device 18 (T11). In other words, the transmission of the display data is pull transmission.

In this way, the data processing system 1 according to the first embodiment can selectively output only operation data that is used for calculating display data using an encrypted communication protocol. In this way, output of operation data that is not used for calculation is prevented, and operation data used for calculation being intercepted by a third party can be prevented. Thus, the data processing system 1 can calculate display data while achieving protection of operation data.

In addition, in the data processing system 1, unintended communication is blocked as below.

Between the agent device 13 and the client device 18 and the service broker device 15, a communication protocol that has not been set in advance or communication that has not been registered or permitted in advance is blocked by the firewall device 14. For example, data requests for the data collecting device 12 and the agent device 13 are accesses from outside of the central network N1 to the inside of the central network N1 and thus are blocked by the firewall device 14. A transmission source of push transmission of unauthorized operation data to the computation server device 16 is not a defined agent device 13, and thus the push transmission is blocked by the service broker device 15. A data request for operation data for the computation server device 16 is not defined communication and thus is blocked by the service broker device 15.

<Operation and Effects>

In this way, according to the first embodiment, the agent device 13 transmits part of the data used for generating display data among a plurality of pieces of operation data collected from the instrument 11 to the service broker device 15 through the firewall device 14. The service broker device 15 relays part of data transmitted from the agent device 13 through the firewall device 14 to the computation server device 16. The computation server device 16 generates display data on the basis of part of the data relayed by the service broker device 15. In this way, the agent device 13 can cause the computation server device 16 to generate display data without allowing all the operation data of the instrument 11 to be accessible. In other words, the data processing system 1 according to the first embodiment can restrict acquisition of operation data of the instrument 11 while protecting knowhow based on the operation data.

In addition, according to the first embodiment, the agent device 13 and the instrument 11 are connected using the central network N1, and the service broker device 15 and the computation server device 16 are connected using the service network N2. The firewall device 14 is disposed outside the central network N1. In this way, the data processing system 1 according to the first embodiment can appropriately transmit information of the instrument 11 belonging to any other network to the computation server device 16.

Furthermore, according to the first embodiment, the service broker device 15 performs pull transmission of the display data generated by the computation server device 16 to the client device 18 on the basis of a data request from the client device 18 outside the service network N2. In this way, by performing pull transmission of display data through the service broker device 15, the data processing system 1 according to the first embodiment can prevent an outflow of unintended data due to an unauthorized data request.

In addition, according to the first embodiment, the service broker device 15 and the computation server device 16 are mounted in separate computers. Here, the separate computers may include separate virtual computers that are disposed on the same physical computer using a virtualization technology. In accordance with this, an update of communication control of the service broker device 15 and an update of the computation logic of the computation server device 16 can be separately performed. In another embodiment, one device may have the functions of the service broker device 15 and the computation server device 16.

According to the first embodiment, although the data collecting device 12 and the agent device 13 are mounted in separate computers, in another embodiment, one device may have the functions of the data collecting device 12 and the agent device 13.

In addition, according to the first embodiment, the agent device 13 performs push transmission of part of data in a case in which a predetermined condition is satisfied and does not perform pull transmission of part of data based on a data request. In this way, the agent device 13 can prevent an outflow of unintended data.

In addition, according to the first embodiment, the agent device 13 acquires structured data from the data collecting device on the basis of a protocol defined in the data collecting device 12, extracts the part of the data described above from the structured data, and transmits the extracted data on the basis of a general encrypted communication protocol. In accordance with this, even in a case in which the data collecting device 12 accepts only transmission of data in a protocol for which it is difficult to objectively check the security, the agent device 13 can transmit necessary data on the basis of a protocol for which it is easy to objectively check the security.

As above, while one embodiment has been described with reference to the drawings, a specific configuration is not limited to that described above, and various design changes and the like can be made.

For example, although the data processing system 1 according to the embodiment described above includes one agent device 13, the configuration is not limited thereto. For example, a data processing system 1 according to another embodiment may include a plurality of agent devices 13. In such a case, by distributing the amount of transmission of data to the plurality of agent devices 13, the amount of transmission of data of one agent device 13 may be reduced. On the other hand, in such a case, the plurality of agent devices 13 may perform push transmission of the same operation data using different encrypted protocols. In accordance with this, the service broker device 15 can firmly verify validity of operation data. In other words, by including a plurality of agent devices 13, the data processing system 1 can strengthen diversity or multiplexing. In addition, in another embodiment, the data processing system 1 may include a plurality of data collecting devices 12 and a plurality of agent devices 13 corresponding to the data collecting devices 12. In such a case, each of the agent devices 13 can acquire operation data using a corresponding communication system from the data collecting device 12.

Although the data processing system 1 according to the embodiment described above transmits the operation data of the instrument 11, the transmission is not limited thereto. For example, the data processing system 1 may transmit other data such as a statistic calculated on the basis of the operation data by the data collecting device 12 or the like. In other words, the data processing system 1 transmits data relating to operation data.

Although the data processing system 1 according to the embodiment described above has a network configuration in which the agent device 13 and the instrument 11 are connected using the central network N1, and the service broker device 15 and the computation server device 16 are connected using the service network N2, the network configuration is not limited thereto. For example, the agent device 13 may be disposed in the service network N2, and the central network N1 and the service network N2 may be connected using a wide area communication network such as the Internet.

Figure 7:
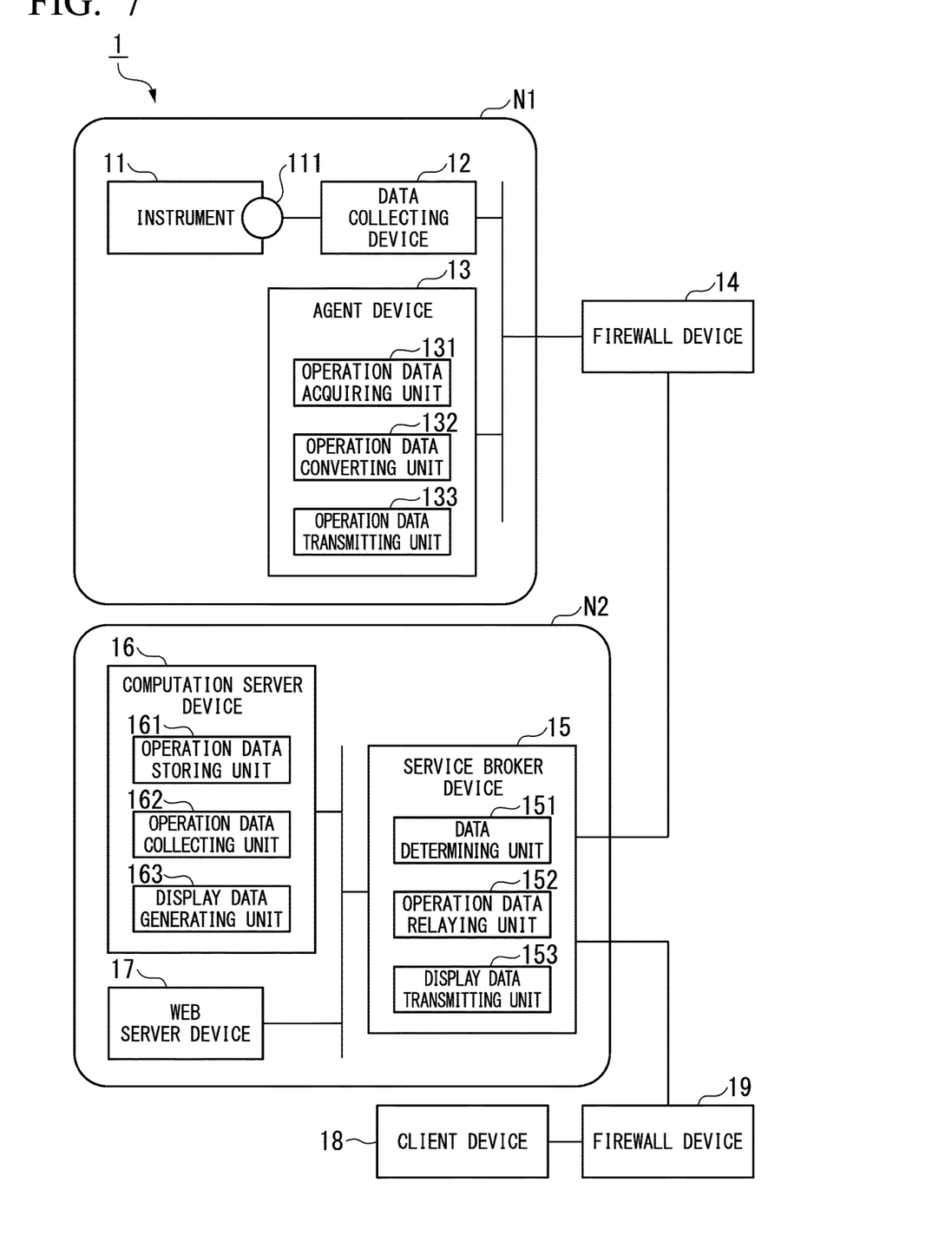
FIG. 7 is a schematic view illustrating the configuration of a data processing system according to another embodiment.
Figure 8:
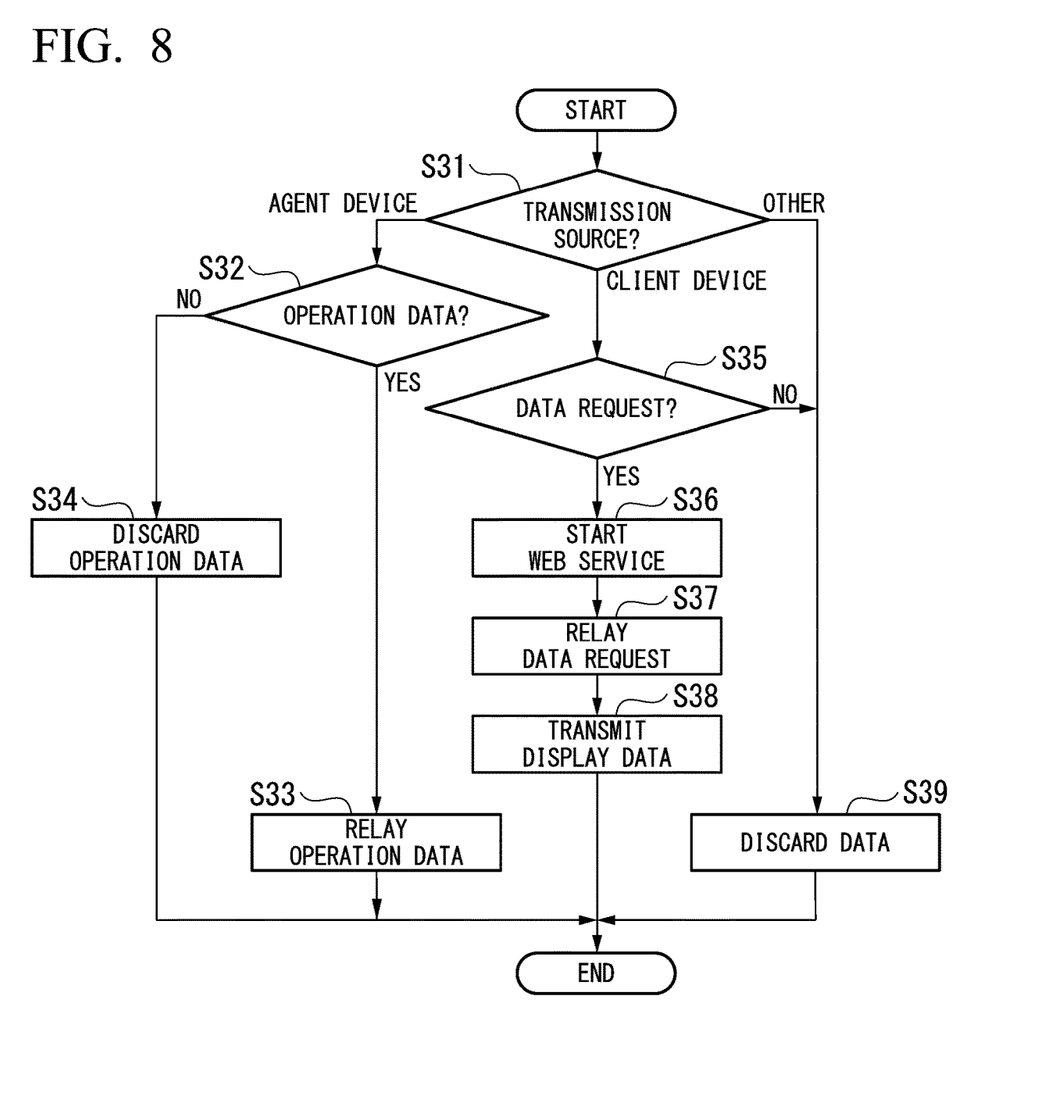
FIG. 8 is a flowchart illustrating an operation of a service broker device according to another embodiment.

In addition, although the data processing system 1 according to the embodiment described above processes the communication between the central network N1 and the service network N2, the communication between the central network N1 and the client device 18, and the communication between the service network N2 and the client device 18 using the same firewall device 14, the configuration is not limited thereto. FIG. 7 is a schematic view illustrating the configuration of a data processing system according to another embodiment. For example, in another embodiment, as illustrated in FIG. 7, separately from a firewall device 14 disposed between a central network N1 and a service network N2, a firewall device 19 disposed between the service network N2 and a client device 18 may be provided. By including the individual firewall devices 14 and 19 respectively between the central network N1 and the service network N2 and between the service network N2 and the client device 18, the client device 18 can be disposed in a safe section outside (at a lower rank) of the service network N2.

In the embodiment described above, although the computation server device 16 and the web server device 17 are mounted in separated computers, the configuration is not limited thereto. For example, the computation server device 16 may have a web server function. By mounting the computation server device 16 and the web server device 17 in separate computers, the service broker device 15 can prohibit pull transmission from the computation server device 16, and thus the possibility of unnecessary data being transmitted from the computation server device 16 can be reduced.

In addition, as illustrated in FIG. 3, the service broker device 15 according to the embodiment described above determines a device that is a transmission source in a case in which the type of communication is operation data and relays data in the case of the agent device 13. On the other hand, the service broker device 15 relays data without determining a device that is a transmission source in a case in which the type of communication is a data request. In another embodiment, the process of the service broker device 15 is not limited thereto. For example, a service broker device 15 according to another embodiment may perform processes in the order described below. FIG. 7 is a flowchart illustrating the operation of the service broker device according to another embodiment.

For example, when the service broker device 15 according to another embodiment receives communication from an external device, the data determining unit 151 determines whether or not a device that is a transmission source of the communication is an agent device 13 defined in advance, a client device 18 defined in advance, or other device (Step S31). In a case in which the transmission source of the communication is the agent device 13 (Step S31: agent device), the data determining unit 151 determines whether or not the communication is push transmission of operation data (Step S32). In a case in which the communication is push transmission of operation data (Step S32: Yes), the operation data relaying unit 152 relays the received operation data to the computation server device 16 (Step S33). In a case in which the communication is not push transmission of operation data (Step S32: No), the data determining unit 151 discards the operation data (Step S34).

In addition, in a case in which the transmission source of the communication is the client device 18 (Step S31: client device), the data determining unit 151 determines whether or not the communication is a data request for display data (Step S35). In a case in which the data determining unit 151 determines that a data request for display data has been received (Step S35: Yes), the display data transmitting unit 153 causes the web server device 17 to start a web service for presenting display data on the basis of the accepted data request (Step S36). The display data transmitting unit 153 relays the data request to the web server device 17 (Step S37). The display data transmitting unit 153 acquires display data from the web server device 17 and transmits the acquired display data to the client device 18 (Step S38).

In a case in which it is determined that the transmission source of the communication is neither the agent device 13 nor the client device 18 (Step S31: other) or in a case in which communication received from the client device 18 is not a data request (Step S35: No), the data determining unit 151 discards the data (Step S39).

In addition, in a case in which the type of communication is determined to be a data request in Step S11 of the first embodiment, the service broker device 15 according to another embodiment may determine whether or not the device that is the transmission source is a client device 18 defined in advance and relay the data request in a case in which the device that is the transmission source is the client device 18 defined in advance.

Furthermore, the service broker device 15 according to another embodiment may determine whether or not the transmission source of the communication is the agent device in Step S31 of another embodiment illustrated in FIG. 7 and, in a case in which a device other than the agent device is the transmission source, the service broker device 15 may relay a data request without using the device that is the transmission source in a case in which the type of the communication is the data request.

<Configuration of Computer>

Figure 6:
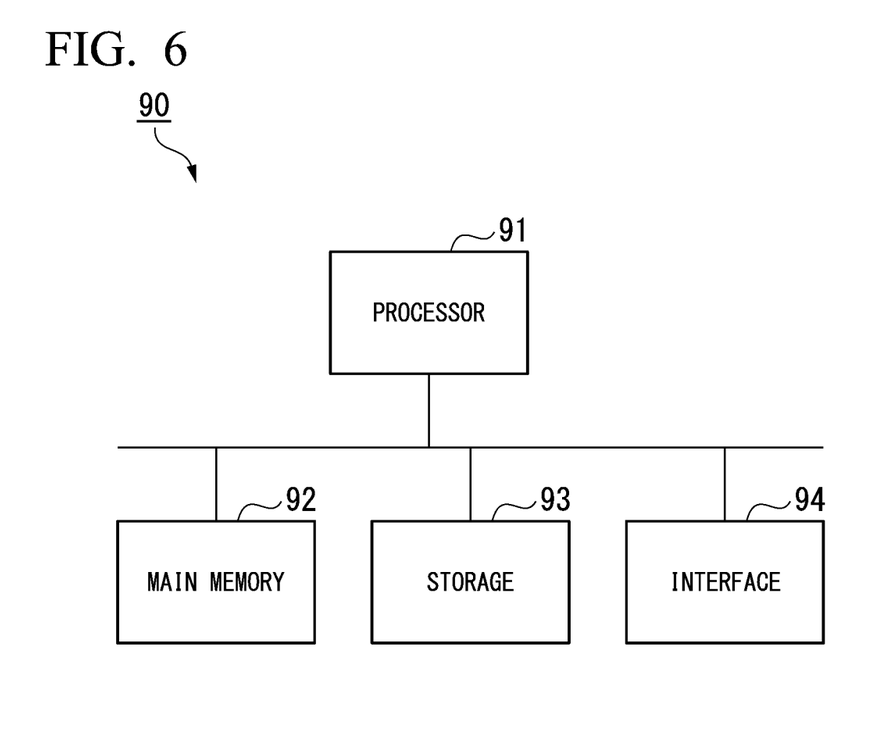
FIG. 6 is a schematic block diagram illustrating the configuration of a computer according to at least one embodiment.

FIG. 6 is a schematic block diagram illustrating the configuration of a computer according to at least one embodiment.

The computer 90 includes a processor 91, a main memory 92, a storage 93, and an interface 94.

The data collecting device 12, the agent device 13, the service broker device 15, the computation server device 16, and the web server device 17 described above are mounted in the computer 90. The operation of each processing unit described above is stored in the storage 93 in the form of a program. The processor 91 reads a program from the storage 93, expands the read program into the main memory 92, and executes the process described above in accordance with the program. In addition, the processor 91 secures a storage area corresponding to each storage unit described above in the main memory 92 in accordance with the program.

Examples of the storage 93 includes a hard disk drive (HDD), a solid state drive (SSD), a magnetic disk, a magneto-optical disk, a compact disc read only memory (CD-ROM), a digital versatile disc read only memory (DVD-ROM), a semiconductor memory, and the like. The storage 93 may be an internal medium directly connected to a bus of the computer 90 or an external medium connected to the computer 90 through the interface 94 or a communication line. In addition, in a case in which this program is distributed to the computer 90 through a communication line, the computer 90 that has received the program may expand the program into the main memory 92 and execute the process described above. In at least one embodiment, the storage 93 is a non-transitory storage medium.

In addition, the program may be used for realizing some of the functions described above. Furthermore, the program may realize the function described above by being combined with another program stored in the storage 93 in advance, a so-called a differential file (differential program).

INDUSTRIAL APPLICABILITY

The data processing system can restrict acquisition of operation data of an instrument while protecting know-how based on the operation data.

REFERENCE SIGNS LIST

1 Data processing system
11 Instrument
12 Data collecting device
13 Agent device
131 Operation data acquiring unit
132 Operation data converting unit
133 Operation data transmitting unit
14 Firewall device
15 Service broker device
151 Data determining unit
152 Operation data relaying unit
153 Display data transmitting unit
16 Computation server device 161 Operation data storing unit
162 Operation data collecting unit
163 Display data generating unit
17 Web server device
18 Client device
N1 Central network
N2 Service network

The invention claimed is:

1. A data processing system comprising:
an agent device configured to transmit data relating to operation data of an instrument that is collected from the instrument;
a service broker device configured to relay data; and
a computation server device configured to generate display data on the basis of the data relating to the operation data,
wherein the agent device includes an operation data transmitting unit that push-transmits data, which is used for generating the display data, of data relating to a plurality of pieces of operation data collected from the instrument to the computation server device,
wherein the service broker device comprises a processor and a non-transitory recording medium having a computer stored thereon, wherein computer program instructions, when executed by the processor, perform to:
determine whether a type of a communication from an external device is push transmission or not;
determine whether the operation data is transmitted from the agent device;
relay, when it is determined that the communication from the external device is push transmission of the operation data, the data that is determined the data transmitted from the agent device to the computation server device; and
not relay, when it is determined that the communication from the external device is push transmission of the operation data, the data that is determined not the data transmitted from the agent device to the computation server device,
wherein the computation server device includes a display data generating unit that generates the display data on the basis of the data relayed by the service broker device.

2. The data processing system according to claim 1,
wherein the agent device and the instrument are connected using a first network,
wherein the service broker device and the computation server device are connected using a second network other than the first network, and
wherein a transmission path for transmitting the certain data from the agent device to the service broker device is disposed outside the first network.

3. The data processing system according to claim 2, wherein the service broker device performs pull transmission of the display data generated by the computation server device to a client device on the basis of a data request from the client device disposed outside the second network.

4. The data processing system according to claim 3, further comprising:
a first firewall device configured to be disposed between the agent device and the service broker device and to block a transmission from the service broker device to the agent device; and
a second firewall device other than the first firewall device configured to be disposed between the service broker device and the client device and to relay a pre-permitted transmission from the client device to the service broker device.

5. The data processing system according to claim 1, wherein the service broker device and the computation server device are mounted in separate computers.

6. The data processing system according to claim 1, wherein the operation data transmitting unit of the agent device performs push transmission of the data in a case in which a predetermined condition is satisfied and does not perform pull transmission of the data based on a data request.

7. The data processing system according to claim 1,
wherein the agent device includes an operation data acquiring unit that acquires the data that is structured on the basis of a predetermined protocol defined by a data collecting device from the data collecting device that structures the data relating to the plurality of pieces of operation data collected from the instrument, and
wherein the operation data transmitting unit transmits the acquired data on the basis of a general encrypted communication protocol.

8. A data processing system comprising:
a service broker device configured to relay data that is transmitted from an agent device transmitting data, which is used for generating display data, of data relating to operation data of an instrument collected from the instrument; and
a computation server device configured to generate the display data on the basis of the data,
wherein the service broker device comprises a processor and a non-transitory recording medium having a computer stored thereon, wherein computer program instructions, when executed by the processor, perform to:
determine whether a type of a communication from an external device is push transmission or not;
determine whether the operation data transmitted from the agent device;
relay, when it is determined that the communication from the external device is push transmission of the operation data, the data that is determined the data transmitted from the agent device to the computation server device; and
not relay, when it is determined that the communication from the external device is push transmission of the operation data, the data that is determined not the data transmitted from the agent device to the computation server device,
wherein the computation server device includes a display data generating unit that generates the display data on the basis of the data relayed by the service broker device.

9. A data processing method comprising:
a step of transmitting certain data, which is used for generating display data, of data relating to a plurality of pieces of operation data collected from an instrument;
a step of determining whether a type of a communication from an external device is push transmission or not;
a step of determining whether the operation data is transmitted from an agent device;
a step of relaying, when it is determined that the communication from the external device is push transmission of the operation data, the data that is determined the data transmitted from the agent device to the computation server device;

a step of not relaying, when it is determined that the communication from the external device is push transmission of the operation data, the data that is determined not the data transmitted from the agent device to the computation server device; and a step of generating the display data on the basis of the relayed data.

10. A non-transitory computer-readable storage medium storing a program used for causing a computer to execute:

a step of determining whether a type of a communication from an external device is push transmission or not;

a step of determining whether operation data is transmitted from an agent device;

a step of relaying, when it is determined that the communication from the external device is push transmission of the operation data, the data that is determined the data transmitted from the agent device to a computation server device, and not relaying, when it is determined that the communication from the external device is push transmission of the operation data, the data that is determined not the data transmitted from the agent device to the computation server device;

a step of generating display data on the basis of the relayed data.

* * * * *